US012790136B2

(12) United States Patent
Waschbüsch et al.

(10) Patent No.: US 12,790,136 B2
(45) Date of Patent: Nov. 10, 2026

(54) SYSTEM AND METHOD FOR THE MULTI-STEP PROCESSING OF PLANAR SUBSTRATES

(71) Applicant: Schott AG, Mainz (DE)

(72) Inventors: Michael Waschbüsch, Undenheim (DE); Klaus-Peter Kurek, Mainz (DE); Ulrich Engelhardt, Hannover (DE); Volker Plapper, Alzey (DE)

(73) Assignee: SCHOTT AG, Mainz (DE)

( * ) Notice: Subject to any disclaimer, the term of this patent is extended or adjusted under 35 U.S.C. 154(b) by 156 days.

(21) Appl. No.: 18/692,150

(22) PCT Filed: Aug. 11, 2022

(86) PCT No.: PCT/EP2022/072524
§ 371 (c)(1),
(2) Date: Mar. 14, 2024

(87) PCT Pub. No.: WO2023/041263
PCT Pub. Date: Mar. 23, 2023

(65) Prior Publication Data

US 2025/0187854 A1 Jun. 12, 2025

(30) Foreign Application Priority Data

Sep. 14, 2021 (DE) ..................... 10 2021 123 777.7

(51) Int. Cl.
*B65G 49/06* (2006.01)
*C03B 33/03* (2006.01)
*C03B 33/033* (2006.01)

(52) U.S. Cl.
CPC ......... *B65G 49/061* (2013.01); *B65G 49/063* (2013.01); *B65G 49/067* (2013.01);
(Continued)

(58) Field of Classification Search
CPC .. B65G 49/061; B65G 49/063; B65G 49/067; C03B 33/03; C03B 33/033
See application file for complete search history.

(56) References Cited

U.S. PATENT DOCUMENTS

| | | | | |
|---|---|---|---|---|
| 8,327,667 B2 * | 12/2012 | Balduin | .............. | C03B 23/0258 65/106 |
| 11,676,843 B2 * | 6/2023 | Müssig | .............. | H10P 72/0456 438/106 |

(Continued)

FOREIGN PATENT DOCUMENTS

| | | |
|---|---|---|
| DE | 10 2007 007 974 A1 | 6/2008 |
| DE | 10 2019 134 410 A1 | 6/2021 |

(Continued)

OTHER PUBLICATIONS

Notification of Transmittal of the International Search Report and the Written Opinion of the International Searching Authority, or the Declaration dated Nov. 29, 2022 for International Patent Application No. PCT/EP2022/072524 (16 pages).

(Continued)

*Primary Examiner* — Omar Flores Sanchez
(74) *Attorney, Agent, or Firm* — TAYLOR & EDELSTEIN, PC

(57) ABSTRACT

The invention relates to a system and a method for the multi-step processing of planar substrates, more particularly planar glass substrates, on a substrate carrier, wherein a plurality of mutually spatially separated processing stations are interconnected by means of a substrate-carrier conveying device, and wherein a substrate carrier is conveyed from one processing station to the next processing station by means of the substrate-carrier conveying device in order to subject a planar substrate laid on a substrate carrier to a plurality of processing steps in succession.

16 Claims, 2 Drawing Sheets

(52) U.S. Cl.
CPC ............ *C03B 33/03* (2013.01); *C03B 33/033* (2013.01); *B65G 2201/022* (2013.01); *B65G 2249/02* (2013.01); *B65G 2249/04* (2013.01)

(56) References Cited

U.S. PATENT DOCUMENTS

| | | | | |
|---|---|---|---|---|
| 12,021,058 | B2 * | 6/2024 | Oetzel | H10P 72/0446 |
| 2001/0015074 | A1 | 8/2001 | Hosokawa | |
| 2003/0127484 | A1 * | 7/2003 | Wirsam | B65G 49/068 225/2 |
| 2008/0190981 | A1 * | 8/2008 | Okajima | C03B 33/03 225/2 |
| 2010/0068014 | A1 * | 3/2010 | Mitsuyoshi | B65G 49/061 414/226.04 |
| 2010/0126415 | A1 * | 5/2010 | Ishino | H10P 72/3306 118/500 |
| 2010/0243163 | A1 * | 9/2010 | Ino | C23C 16/54 156/345.31 |
| 2011/0318144 | A1 * | 12/2011 | Kobayashi | H10P 72/0456 414/222.01 |
| 2013/0051957 | A1 * | 2/2013 | Lee | H10P 72/0456 414/222.01 |
| 2013/0287526 | A1 | 10/2013 | Bluck et al. | |
| 2014/0081443 | A1 * | 3/2014 | Bando | B65G 49/067 700/112 |
| 2020/0198903 | A1 * | 6/2020 | Yun | B65G 49/061 |
| 2021/0139254 | A1 * | 5/2021 | Buchanan | B65G 61/00 |
| 2021/0403364 | A1 * | 12/2021 | Briese | B65G 15/30 |
| 2022/0306514 | A1 | 9/2022 | Hwang | |

FOREIGN PATENT DOCUMENTS

| | | | | |
|---|---|---|---|---|
| DE | 10 2020 134 451 | A1 | 6/2022 | |
| DE | 10 2021 116 381 | A1 | 12/2022 | |
| EP | 3 838 853 | A1 | 6/2021 | |
| JP | 2003-267743 | A | 9/2003 | |
| JP | 2006-176255 | A | 7/2006 | |
| WO | WO-2021069328 | A1 * | 4/2021 | H10P 72/3314 |

OTHER PUBLICATIONS

German Office Action dated Jan. 17, 2022 for German Patent Application No. 10 2021 123 777.7 (12 pages).

* cited by examiner

SYSTEM AND METHOD FOR THE MULTI-STEP PROCESSING OF PLANAR SUBSTRATES

CROSS-REFERENCE TO RELATED APPLICATIONS

This application is a national stage entry under 35 U.S.C. § 371 of International Patent Application No. PCT/EP2022/072524 entitled "SYSTEM AND METHOD FOR THE MULTI-STEP PROCESSING OF PLANAR SUBSTRATES," filed on Aug. 11, 2022, which is incorporated in its entirety herein by reference. International Patent Application No. PCT/EP2022/072524 claims priority to German Patent Application No. 10 2021 123 777.7 filed on Sep. 14, 2021, which is incorporated in its entirety herein by reference.

BACKGROUND OF THE INVENTION

The invention relates to a plant and a method for the multi-step processing of flat substrates, in particular flat glass substrates.

Flat substrates, for example glass, thin glass, ultra-thin glass (UTG), wafers, films and other thin substrates may be sold in various forms after their production. Depending on the material properties, it may for example be suitable for such substrates to be rolled up or stacked. Sometimes, however, further processing after production is desirable, for example in order to be able to provide desired standards, for example particular intermediate sizes or final sizes, to improve the transportability and/or to facilitate the further processing.

If such post-processing is intended to be process-optimized, for example in respect of speed, level of automation or costs, difficulties may however sometimes arise if the upstream production involves particular process sequences, for example chronological sequences, which do not correspond directly to those of the post-processing. This may, for example, be the case when the production is carried out continuously but particular cycling is preferable for optimization of the post-processing.

Thin glass and ultra-thin glass (UTG) are generally produced by means of drawing methods, a particular glass thickness being obtainable as a function of the drawing rate. In particular, high drawing rates may be used in order to produce very thin glass. In the case of glass production, for example of thin glass or UTG, processing may be desirable after the melting and the shaping, which may for example comprise thickness measurement, fault detection, removing borders, singulation of the sheets (transverse division), sidewall inspection, format control and/or packaging. These process steps may for example be implemented and/or carried out vertically or horizontally. In principle, some of the process steps, for example handling steps, may be carried out manually or in automated fashion.

Automation of the online process may, however, be inflexible and increase the complexity of the process chain which is already complex anyway. For instance, the glass strip in the online process thus cannot readily be paused in order for example to carry out cutting (repositioning is elaborate, high outlay for laser technology). Furthermore, functional problems in one individual step could even lead to the entire production line being stopped. In addition, format changes (variation of the drawing rate, variation of the thickness) often require a change to plant constituent parts in order to adapt the cycle rates (for example, additional robots would need to be used in the event of a further increased drawing rate since a working speed of the robots sometimes does not scale to the same extent as that of the hot forming of the glass). The cycle times of the melt and shaping can sometimes be adapted to the ideal cycle times of the post-processing only with high outlay.

In the case of UTG, it is in addition necessary to take into account the lack of intrinsic stiffness and the increased fracture susceptibility in comparison with thicker glasses, the effect of which is that such glasses are particularly difficult to process in the online process. Problems may in particular involve individual sheets in the online process being accelerated at the "cold end", for instance in order to ensure a spacing of the sheets from one another.

In the case of UTG, there may in addition be a high drawing rate of for example more than 10 m/min, preferentially more than 15 m/min, particularly preferentially more than 50 m/min, so that incorporation of the steps of border removal, singulation, inspection, format/sidewall control and/or packaging into the production process is sometimes no longer readily possible without entailing a high automation outlay and/or space requirement. Manual handling and/or packaging at such speeds may be expensive in terms of personnel or cost-intensive or disadvantageous in respect of working safety.

Rolling up a UTG glass strip may have the disadvantage that a higher outlay arises subsequently, for example for unrolling or rejecting glass with defects. In addition, on the market it is sometimes desired to be able to draw UTG glass that has already been prefabricated (intermediate size or final size). This can reduce the outlay for customers and decrease the complexity during the UTG handling.

SUMMARY OF THE INVENTION

It is therefore an object of the invention to provide a plant and a method for the processing, in particular for the post-processing, of flat substrates, in order to be able to provide flat substrates, in particular glass substrates, having desired standards after production, for example with particular sizes, with a defined sidewall strength and/or with good suitability for transport and further processing. One aspect of the object is process optimization of the processing of the flat substrates, particularly in respect of speed, level of automation and/or costs. A further aspect of the object is to allow the processing, or the optimization of the processing, substantially independently of the process sequences and/or chronological sequences of the upstream production sequence. In particular, flexible post-processing for continuous production processes is intended to be made possible, for example for glass, thin glass, UTG, wafers and/or films.

The invention relates to a plant for the multi-step processing of flat substrates, in particular flat glass substrates, on a substrate carrier, comprising a plurality of processing stations spatially divided from one another, which are connected to one another by a substrate carrier conveyor apparatus in order to convey a substrate carrier along a conveyor path defined by the substrate carrier conveyor apparatus from one processing station to the next processing station, in order to subject a flat substrate placed on a substrate carrier successively to a plurality of processing steps in the respective processing stations.

One of the processing stations is configured as a loading station, which is designed to place a flat substrate on a substrate carrier. Furthermore, at least one of the processing stations is configured as an operating station, which is designed to process, for example to cut, a flat substrate placed on a substrate carrier. In addition, one of the processing stations is configured as an unloading station, which is designed to remove a processed flat substrate from a substrate carrier.

In one preferred embodiment, the substrate carrier conveyor apparatus is configured as a carousel so that it defines a closed conveyor path in order to convey a substrate carrier from the loading station via the at least one operating station and the unloading station back again to the loading station.

The substrate carrier conveyor apparatus may comprise a plurality of, in particular four, conveyor sections, each of which define an, in particular linear, conveyor direction, the conveyor directions of the plurality of conveyor sections extending at an angle, in particular at a right angle, with respect to one another.

It is also not ruled out that the substrate carrier conveyor apparatus comprises for example three conveyor sections, which are arranged according to a triangular geometry, or comprises five conveyor sections, which are arranged according to a pentagonal geometry, etc.

Furthermore, it may also be provided that the substrate carrier conveyor apparatus (110) defines a circular conveyor path.

The loading station may comprise a reception device in order to receive a flat substrate, for example to lift it from a stack, and to place the received substrate on a substrate carrier.

The reception device preferably comprises a handling system, for example a robot arm, and/or a suction gripping device with reduced-pressure modules, in order to suction the flat substrate onto the suction gripping device.

The loading station may comprise an inspection device in order to inspect a flat substrate before it is received, particularly in order to identify defects, for example fractures or cracks.

In one development, one or more of the processing stations, in particular the loading station and/or the at least one operating station, comprise means in order to exert a force acting in the direction of the substrate carrier onto the substrate, particularly in order to fix the substrate on the substrate carrier.

These means are preferably configured to induce the force acting in the direction of the substrate carrier by applying a reduced pressure to the surface of the substrate facing toward the substrate carrier, in particular by means of openings in the substrate carrier or an open porosity of the substrate carrier, and/or to induce the force acting in the direction of the substrate carrier by mechanical pressing or attraction of the substrate onto the substrate carrier, and/or to induce the force acting in the direction of the substrate carrier by adhesion forces or surface forces (for example van der Waals forces or electrostatic forces), in particular by electrostatically charging the substrate and/or the substrate carrier.

The plant may comprise a substrate carrier which comprises openings or an open porosity for applying reduced pressure to a placed substrate, and/or has a surface that has an increased electrostatic chargeability or increased tribological properties, in order to fix a placed substrate on the substrate carrier.

The or one of the operating stations may be configured as a pre-dividing station, which is designed to pre-divide a flat substrate placed on a substrate carrier along a predefined dividing line, particularly in such a way that the dividing line separates a waste face of the substrate from a useful face of the substrate.

The pre-division may in particular comprise introduction of damage into the substrate, which preferably extends along the predefined dividing line and is introduced into the substrate for example by means of a laser, a scoring wheel, a diamond, water-jet cutting and/or ultrasonic cutting.

The pre-division may furthermore comprise in particular introduction of laser radiation into the substrate, damages, in particular filamentary damages, being introduced into the substrate preferably spaced apart from one another in succession along the predefined dividing line.

The or one of the operating stations may be configured as a separating station, which is designed to separate a flat substrate placed on a substrate carrier along a predefined dividing line into a plurality of portions, particularly into a portion having a waste face of the substrate and a portion having a useful face of the substrate.

The separation may in particular comprise action of force, moment, temperature, vibration and/or fracture of the flat substrate on a predefined dividing line, in particular at a damage or a plurality of damages which extend along the dividing line.

The or one of the operating stations may be configured as a waste station, which is designed to reject waste material, located on a substrate carrier, of a flat substrate from useful material, located on the substrate carrier, of the flat substrate, in particular to reject a portion separated along a predefined dividing line having a waste face of the substrate from a portion separated along the dividing line having a useful face of the substrate.

The rejection may, in particular, comprise removal of the waste material, in particular of a portion having a waste face of the substrate, from the substrate carrier.

The rejection may furthermore comprise in particular capture and isolation of the useful material, in particular of a portion having a useful face of the substrate, from the substrate carrier.

In one embodiment of the invention, the or one of the operating stations may be both configured as a separating station and configured as a waste station. In other words, the operating station may form a combined separating and waste station.

Furthermore, other processing stations may be configured as combined stations. For example, it may be provided that the unloading station is integrated into the waste station so that the net material can already be inspected, unloaded and packaged during the discarding of the waste material.

Furthermore, for example, the pre-dividing station may also be integrated into the waste station. In this case, for example, a robot arm may be provided on which the laser unit (for example a fiber laser with a scanner) is mounted and which is designed to alternate with a further robot arm on which the breaking unit is fitted. For example, a third robot arm which performs the unloading may for example also be provided. Alternatively, for example, a robot arm which respectively receives a corresponding tool may however also be provided.

In general, however, it may be advantageous to divide individual working steps spatially and/or chronologically so that in principle respective processing stations may be configured to be spatially divided.

The or one of the operating stations may be configured as a substrate cleaning station, which is designed to clean an, in particular processed, flat substrate placed on a substrate carrier and/or useful material, located on the substrate carrier, of the flat substrate, in particular a portion having a useful face of the substrate.

The or one of the operating stations may be configured as an inspection station, which is designed to inspect an, in particular processed, flat substrate placed on a substrate carrier and/or useful material, located on the substrate carrier, of the flat substrate, in particular a portion having a useful face of the substrate, particularly in order to identify defects, for example fractures or cracks.

The unloading station may comprise a reception device in order to receive from a substrate carrier a processed flat substrate and/or useful material of the flat substrate, in particular a portion having a useful face of a substrate, and for example to deposit it in a packaging box and/or on a stack.

The reception device preferably comprises a handling system, for example a gantry system or a robot arm, and/or a suction gripping device with reduced-pressure modules, in order to suction the processed flat substrate and/or useful material of the flat substrate, in particular a portion having a useful face of a substrate onto the suction gripping device.

The unloading station may comprise an inspection device in order to inspect a processed flat substrate and/or useful material of the flat substrate, in particular a portion having a useful face of a substrate, before it is received, particularly in order to identify particles, contaminants, defects, for example geometrical faults, angle faults, shells, fractures or cracks.

It may be provided that one of the processing stations is configured as a substrate carrier cleaning station, which is designed to clean a substrate carrier, in particular after a processed flat substrate and/or useful material of the flat substrate, in particular a portion having a useful face of a substrate, has been taken from the substrate carrier. Furthermore, it may be provided here to adjust surface forces optionally used for the adhesion.

The loading station may be arranged between the substrate carrier cleaning station and the pre-dividing station within the conveyor path, and may preferentially be arranged immediately between them. The loading station may be arranged inside the first or second conveyor section of the substrate carrier conveyor apparatus.

The pre-dividing station may be arranged between the loading station and the separating station within the conveyor path, and may preferentially be arranged immediately between them. The pre-dividing station may be arranged inside the second conveyor section of the substrate carrier conveyor apparatus.

The separating station may be arranged between the pre-dividing station and the waste station within the conveyor path, and may preferentially be arranged immediately between them. The separating station may be arranged inside the second or third conveyor section of the substrate carrier conveyor apparatus.

The waste station may be arranged between the separating station and the unloading station within the conveyor path, and may preferentially be arranged immediately between them. The waste station may be arranged inside the second or third conveyor section of the substrate carrier conveyor apparatus.

In the case of a combined separating and waste station, this may be arranged between the pre-dividing station and the unloading station within the conveyor path, and may preferentially be arranged immediately between them. The combined separating and waste station may be arranged inside the second or third conveyor section of the substrate carrier conveyor apparatus.

The unloading station may be arranged between the waste station and the substrate carrier cleaning station within the conveyor path, and may preferentially be arranged immediately between them. The unloading station may be arranged inside the third or fourth conveyor section of the substrate carrier conveyor apparatus.

The substrate carrier cleaning station may be arranged between the unloading station and the loading station within the conveyor path, and may preferentially be arranged immediately between them. The substrate carrier cleaning section may be arranged inside the fourth conveyor section of the substrate carrier conveyor apparatus. In one development, the plant comprises a white room and/or clean room in which the substrate carrier conveyor apparatus and/or the or some of the processing stations are arranged, and preferably an airlock into the white room and/or clean room, through which flat substrates are supplied to the plant, for example in stacks or on a conveyor section.

The plant may be joined directly (in particular by means of the airlock into the clean room) to a device for melting and/or shaping raw material for the flat substrates, in particular raw glass having borders.

The invention furthermore relates to a method for the multi-step processing of flat substrates, in particular flat glass substrates, on a substrate carrier, wherein a flat substrate is placed on a substrate carrier in a processing station configured as a loading station, and wherein the substrate carrier is conveyed together with the placed flat substrate from the loading station by means of a substrate carrier conveyor apparatus directly or via one or more further processing stations to a processing station configured as an operating station, and wherein the flat substrate placed on the substrate carrier is processed, for example cut, in the operating station, and wherein the substrate carrier is conveyed together with the placed processed flat substrate from the operating station by means of the substrate carrier conveyor apparatus directly or via one or more further processing stations to a processing station configured as an unloading station, and wherein the processed flat substrate placed on the substrate carrier is taken from the substrate carrier in the unloading station.

In one preferred embodiment, the substrate carrier is conveyed from the unloading station by means of the substrate carrier conveyor apparatus back again to the loading station.

In one exemplary configuration, the substrate carrier is conveyed together with the placed flat substrate from the loading station by means of a substrate carrier conveyor apparatus directly or via one or more further processing stations to an operating station configured as a pre-dividing station, and the flat substrate placed on the substrate carrier is pre-divided along a predefined dividing line in the pre-dividing station, and the substrate carrier is conveyed together with the placed pre-divided flat substrate from the pre-dividing station by means of the substrate carrier conveyor apparatus directly or via one or more further processing stations to an operating station configured as a separating station, and the pre-divided flat substrate placed on the substrate carrier is separated along the predefined dividing line into a plurality of portions in the separating station, and the substrate carrier is conveyed together with the plurality of portions of the flat substrate from the separating station by means of the substrate carrier conveyor apparatus directly or via one or more further processing stations to an operating station configured as a waste station (or the operating station configured as a separating station is simultaneously configured as a waste station), and at least one portion of the flat substrate is rejected in the waste station.

As already described, the loading station may comprise a reception device in order to receive a flat substrate (raw glass reception device) and/or the unloading station may comprise a reception device in order to receive a processed flat substrate and/or useful material of the flat substrate (finished glass reception device). Such a reception device may be configured as a suction gripping device, as described in more detail below. In this context, the German patent application 10 2021 116 381.1 is incorporated by reference into the present application.

The suction gripping device may comprise a base body, in particular for attachment to a robot arm, wherein the base body may define a plane that preferentially extends at least locally parallel to a substrate when the latter is being received.

Furthermore, the suction gripping device may comprise at least one gas suction reduced-pressure module arranged on the base body and at least one gas ejection reduced-pressure module arranged on the base body.

The gas suction reduced-pressure module preferably comprises at least one gas suction opening for the suction of gas and for the generation of a reduced pressure, in particular by means of the Venturi effect, in order to suction the substrate onto the suction gripping device.

The gas ejection reduced-pressure module preferably comprises at least one gas ejection opening for the ejection of gas and for the generation of a reduced pressure, in particular by means of the Bernoulli effect, in order to suction the substrate onto the suction gripping device.

In other words, the suction gripping device may comprise two reduced-pressure modules based on different principles, the gas suction reduced-pressure module generating the reduced pressure by suction of gas above the substrate, while the gas ejection reduced-pressure module generates the reduced pressure by ejection of gas above the substrate, the rapid flow of the gas past the substrate leading to the attraction of the substrate by means of the Bernoulli effect.

The gas suction reduced-pressure module may, for example, be configured as or comprise a Venturi ejector. The gas suction reduced-pressure module may in particular comprise the following: a gas inlet, in particular for the entry of compressed air, a gas outlet, in particular for the re-emergence of the compressed air, a connection extending from the gas inlet to the gas outlet with a constriction, and a connection to the gas suction opening branching off between the gas inlet and the gas outlet, in order to generate the reduced pressure by means of the Venturi effect.

The gas ejection reduced-pressure module may, for example, be configured as or comprise a Bernoulli floating grip. The gas suction reduced-pressure module may in particular comprise the following: a gas inlet, in particular for the entry of compressed air, and a connection from the gas inlet to the gas ejection opening, in particular for the re-emergence of the compressed air, the gas ejection opening being configured in such a way that the ejected gas runs obliquely with respect to the plane of the base body, and preferentially impinges obliquely onto a substrate to be received, in order to generate the reduced pressure by means of the Bernoulli effect.

The gas ejection opening of the gas ejection reduced-pressure module, or Bernoulli floating grip, is preferably configured in such a way that the ejected gas is ejected in the form of a cone and preferentially impinges conically onto the surface of the substrate, so that the gas flows past the substrate and the reduced pressure is created inside the cone. The normal of the cone is preferably perpendicular to the plane of the base body and preferably substantially perpendicular to the surface of a substrate to be received.

The gas suction reduced-pressure module may have a bearing face for at least local bearing of a substrate to be received by the suction gripping device, the gas suction opening being arranged as a recess inside the bearing face. The substrate may therefore be suctioned onto the bearing face by suction of gas.

Preferably, a multiplicity of gas suction openings are arranged as a recess inside the bearing face, for example at least 10 or for example at least 50 gas suction openings, preferably at least 224 gas suction openings, particularly preferentially at least 1108 gas suction openings, even more preferentially at least 1662 gas suction openings.

Furthermore, the bearing face of the gas suction reduced-pressure module preferably has an area of for example 100 square centimeters, preferably at least 530 square centimeters, particularly preferentially an area of at least 1280 square centimeters, even more preferentially an area of at least 1984 square centimeters.

In one preferred embodiment, the suction gripping device has a multiplicity of gas suction reduced-pressure modules, in particular Venturi ejectors, and/or a multiplicity of gas ejection reduced-pressure modules, in particular Bernoulli floating grips.

The gas suction reduced-pressure module or modules, in particular the bearing face thereof, are preferably arranged closer to the center of the plane of the base body than the gas ejection reduced-pressure module or modules, in particular the gas ejection opening thereof. This preferentially applies along at least one direction extending in the plane of the base body, particularly preferentially along two mutually perpendicular directions extending in the plane of the base body.

The gas suction reduced-pressure module or modules, in particular the bearing face thereof, are in addition preferably arranged between the gas ejection reduced-pressure modules, in particular the gas ejection openings thereof. This again preferentially applies along at least one direction extending in the plane of the base body, particularly preferentially along two mutually perpendicular directions extending in the plane of the base body.

For example, the gas ejection reduced-pressure modules (or the Bernoulli floating grips) may be arranged at the edge of the base body. For example, the spacing of the gas ejection reduced-pressure module or modules from the edge of the base body may be less than 10 centimeters, in particular be less than 5 centimeters, preferably be less than 3.5 centimeters, particularly preferentially be less than 0.4 centimeters.

In the case in which the suction gripping device comprises a multiplicity of gas suction reduced-pressure modules, in particular Venturi ejectors, and a multiplicity of gas ejection reduced-pressure modules, in particular Bernoulli floating grips, the gas suction reduced-pressure modules and the gas ejection reduced-pressure modules may for example be arranged mixed together over the plane of the base body. In this case, but also in relation to other embodiments, it can be provided that the or some of the gas suction reduced-pressure modules are drivable individually or in groups and/or the or some of the gas ejection reduced-pressure modules are drivable individually or in groups, particularly in such a way that a locally limited suction can be provided inside the plane of the base body. For example, a local limited suction may be provided by means of a subset of the gas ejection reduced-pressure modules, which are for example arranged peripherally in relation to a substrate to be received, and/or a local limited suction by means of a subset of the gas suction reduced-pressure modules, which are for example arranged more centrally in relation to a substrate to be received. In this way, for example, it is possible to provide a suction gripping device that can be used variably for different substrate sizes.

According to one preferred embodiment, the suction gripping device may be configured to receive flexible thin raw glass plates with borders on mutually opposite edges. Such a suction gripping device may also be referred to as a "raw glass gripper". In this case, along a first direction which extends from one border to the other border when a substrate is received, the suction gripping device may comprise a plurality of for example stripe-shaped reduced-pressure module groups that define a convex face.

For example, the suction gripping device comprises at least one gas suction reduced-pressure module group that is arranged along a first direction between two gas ejection reduced-pressure module groups, which are preferentially arranged on mutually opposite edges of the base body.

The gas suction reduced-pressure module group may comprise one or more, for example four, gas suction reduced-pressure modules, the bearing face of which extends along a second direction running perpendicular to the first direction, preferably in the form of a stripe. In other words, the gas suction reduced-pressure module group may be longer along the second direction (lengthwise with respect to the borders) than along the first direction (perpendicularly to the borders).

The gas ejection reduced-pressure module group may comprise a plurality of gas ejection reduced-pressure modules which are arranged next to one another along the second direction extending perpendicular to the first direction.

The gas suction reduced-pressure module or modules, in particular the gas suction reduced-pressure module group, may define a first suction direction, and in particular may define a first suction direction which extends perpendicularly to the bearing face of the gas suction reduced-pressure module and/or perpendicular to the plane of the base body.

Furthermore, the gas ejection reduced-pressure module or modules, in particular the gas ejection reduced-pressure module groups, may define second suction directions which extend obliquely with respect to the first suction direction, particularly in such a way that the suction directions define (first and second) normals of a convex face in order to receive a flexible flat substrate with concave curvature and/or mutually opposite borders.

In a further development, the suction gripping device may comprise an adjusting apparatus which is designed to vary the inclination between the first suction direction and the second suction direction. For this purpose, for example, an adjusting mechanism may be provided in order to vary an inclination between a gas ejection reduced-pressure module, or a gas ejection reduced-pressure module group, and a gas suction reduced-pressure module, or a gas suction reduced-pressure module group. In particular, the degree of tilting of the Bernoulli grips may be configured to be variably adjustable. In this way, for example, the Bernoulli grips may be brought more tightly onto the substrate to be received. When unstacking a raw glass stack having borders, for example, the degree of tilting may be reduced successively in order to accommodate the fact that the concave curvature of the substrate to be received decreases successively.

According to one preferred embodiment, the suction gripping device may be configured to receive flexible thin finished glass plates without borders. Such a suction gripping device may also be referred to as a "finished glass gripper". In this case, the suction gripping device may comprise a plurality of reduced-pressure modules which define a substantially planar face.

For example, the suction gripping device comprises at least one gas suction reduced-pressure module which is arranged both along a first direction and along a second direction extending perpendicularly to the first direction between at least four gas ejection reduced-pressure modules, which are preferentially arranged in corners or on edge regions of the base body.

Furthermore, the gas suction reduced-pressure module or modules may be arranged inside a quadrilateral defined by four gas ejection reduced-pressure modules, all the gas suction reduced-pressure modules of the suction gripping device preferentially being arranged inside such a quadrilateral. For example, it can thus be provided that the suction gripping device has no gas suction reduced-pressure modules outside an envelope contour defined by the gas ejection reduced-pressure modules.

The gas suction reduced-pressure module or modules may define a first suction direction and the gas ejection reduced-pressure module or modules may define a second suction direction, the first and second suction directions extending parallel to one another, in particular extending perpendicularly to the bearing face of the gas suction reduced-pressure module and/or perpendicularly to the plane of the base body.

It can be provided that the gas ejection reduced-pressure module or modules are set back along the first suction direction, along the second suction direction, perpendicularly to the bearing face of the gas suction reduced-pressure module and/or perpendicularly to the plane of the base body, preferably are set back by at least 0.2 centimeters, particularly preferentially by at least 0.45 centimeters, even more preferably by at least 0.5 centimeters.

In general, in a suction gripping device, the gas suction reduced-pressure module or modules and the gas ejection reduced-pressure module or modules are preferably each configured as independent components, which may for example be available as commercial components. Accordingly, the modules may preferably be separated and/or spaced apart from one another, so that any mutual influence may be minimized.

For example, there may be a spacing of at least 1 centimeter, preferably there may be a spacing of at least 2 centimeters, particularly preferentially there may be a spacing of at least 4 centimeters, between a gas suction reduced-pressure module, in particular the bearing face thereof, and a gas ejection reduced-pressure module, in particular the gas ejection opening thereof.

Preferably, the gas suction reduced-pressure module or modules and the gas ejection reduced-pressure module or modules are drivable independently, particularly in such a way that a flexible flat substrate can first be suctioned by means of a gas ejection reduced-pressure module and then can be suctioned by means of a gas suction reduced-pressure module.

Furthermore, the gas suction reduced-pressure module or modules each have a holding force of at least 12 newtons, preferably at least 37 newtons, particularly preferentially at least 43 newtons, and/or the gas ejection reduced-pressure module or modules each have a holding force of at least 1.8 newtons, preferably at least 3.2 newtons, particularly preferentially at least 5.4 newtons.

Preferentially, the gas suction reduced-pressure module or modules are variably drivable in order to induce at least two different values of the holding force. Furthermore, preferentially, the gas ejection reduced-pressure module or modules are variably drivable in order to induce at least two different values of the holding force. In particular, the suction gripping device may thereby be configured as a combined suction gripping device both for air-impermeable substrates and for air-permeable substrates.

As already described, one or more of the processing stations may comprise means in order to exert a force acting in the direction of the substrate carrier onto the substrate. The means may in this case be configured, for example, to exert a force acting in the direction of the substrate carrier onto the substrate only in the region of an action zone, for example in the region of the useful face of the substrate, as described in more detail below. In this context, the German patent application 10 2020 134 451.1 is incorporated by reference into the present application.

The means may, for example, be configured as a reduced-pressure source in order to apply a reduced pressure to openings in the substrate carrier or to an open porosity of the substrate carrier, or may for example be configured as a downholder or for example as an electrical voltage source.

For example, each of the processing stations may have a reduced-pressure source, a downholder and/or a voltage source, in order to induce a force inside corresponding action zones. It can be provided that a force is not applied during the transport of the substrate carrier.

On the other hand, it can also be provided that the force is maintained during the movement, or during the transport, of the substrate carrier. For example, that the substrate carrier comprises a reduced-pressure source, in such a way that there is for example also a reduced pressure during the handover of the substrate carrier. In this case, for example, the substrate may remain fixed over a plurality of processing stations. The clamping technique may accordingly in principle also be maintained during the transport, that is to say for example during the transfer between two operating stations.

An operating station, in particular the pre-dividing station, may for example be designed to carry out a method for processing, in particular for pre-dividing, a flat substrate, in particular a glass substrate, the substrate being placed onto a substrate carrier, a force acting in the direction of the substrate carrier being exerted in the region of an action zone, particularly in such a way that the substrate is brought closer to the substrate carrier in the region of the action zone, and the force acting in the direction of the substrate carrier not being exerted in the region of a compensating zone, particularly in such a way that the substrate can form temporary deformations in the region of the compensating zone.

By the substrate being stressed particularly in the region of the action zone, but not in the region of the compensating zone, in this example, the planarity of the glass substrate may locally be increased so that the processing, for example by means of laser filamentation, scoring or other forms of processing, is made possible. At the same time, the stresses occurring in the substrate in this case may be kept low, and may in particular be kept lower than in the case of a substrate that is stressed surface-wide, i.e. globally flattened. The reason for this is that the energy required for the deformation is much less and the additional stresses occurring due to the deformation are therefore also much less.

In principle, a locally limited action zone may be provided at any location of the substrate, and the action zone may in particular also differ from the location at which the substrate is processed and/or the locally increased planarity occurs.

For example, the material may thus be fixed only in small action zones away from, in particular as far as possible away from, the zone to be processed. In the case of processing by means of a laser, but also in general, the planarity thereby achieved in the process zone may however sometimes not yet be sufficient in order, for instance, to process the glass sheet with a laser at the focal point.

In the case of processing by means of a laser, but also in general, it may therefore also be suitable to stress the glass sheet in a sufficiently small region in or around the process zone in such a way that it bears in sufficiently planar fashion on the substrate carrier in this zone.

The method for processing, in particular for pre-dividing, a flat substrate, which may preferably be carried out by the operating station, in particular the pre-dividing station, preferably in addition comprises processing, in particular pre-division, for example by means of laser filamentation, scoring or in general any type of pre-division, of the substrate while the force acting in the direction of the substrate carrier is exerted onto the substrate in the region of the action zone.

The method which may preferably be carried out by the operating station, in particular the pre-dividing station, is suitable for example especially for thin and large-area substrates, wherein the substrate may have a useful face and a waste face (for example borders). The substrate preferably comprises brittle material, in particular having intrinsic material stresses, for example glass, vitreous materials, ceramic or glass ceramic, or consists of such a material.

Preferably, the substrate has in the region of a useful face a thickness which is less than 100 μm, preferentially is less than 70 μm, particularly preferentially is less than 50 μm, or is less than 40 μm.

Preferably, the substrate has a greater thickness in the region of a waste face, in particular a thickness which is greater at least by a factor of 2, at least by a factor of 3 or at least by a factor of 5 than the thickness in the region of the useful face.

The waste face preferably comprises an edge region of the substrate, extending along a sidewall of the substrate, particularly preferentially two mutually opposite edge regions of the substrate respectively extending along a sidewall of the substrate, between which the useful face is located, wherein the one or two mutually opposite edge regions of the substrate may for example be configured as borders.

The waste face may furthermore comprise one or two further edge regions of the substrate, respectively extending along sidewalls perpendicular thereto, for example in such a way that an edge region to be divided is provided along each sidewall in the case of a quadrilateral substrate.

The substrate preferably has a length which is greater than 100 mm, preferentially is greater than 300 mm, particularly preferentially is greater than 500 mm, or is greater than 600 mm, or is greater than 700 mm. The length is in particular intended to mean the dimension that extends along the border.

The substrate preferably has a width which is greater than 100 mm, preferentially is greater than 300 mm, particularly preferentially is greater than 500 mm, or is greater than 600 mm, or is greater than 700 mm. The width is in particular intended to mean the dimension that extends perpendicularly to the border.

Overall, the substrate may have an area which is greater than 0.01 $m^2$, is greater than 0.1 $m^2$, or is even greater than 0.25 $m^2$.

As already described, a force may be exerted not surface-wide but only locally onto the substrate in the operating station, in particular the pre-dividing station. The action zone, inside which the force acting in the direction of the substrate carrier is exerted onto the substrate, is in particular less than 80% of the area of the substrate, preferentially less than 60% of the area of the substrate, particularly preferentially less than 40% of the area of the substrate.

The compensating zone, inside which the force acting in the direction of the substrate carrier is not exerted onto the substrate, is in particular greater than 20% of the area of the substrate, preferentially greater than 40% of the area of the substrate, particularly preferentially greater than 60% of the area of the substrate.

Particularly in the case of processing by means of a laser, but also in general, it may be suitable to exert a force onto the substrate in the processing region, in the vicinity of the processing region or even surrounding the processing region. In this case, but also in general, the lateral extent of the width around the zone to be processed may be determined or determinable empirically from the material-specifically existing stresses. These may turn out to be very different depending on the hot-forming process and material.

For example, it may be provided that the action zone in which the force acts comprises at least a part of the waste face, in particular an edge region, in particular a border, as well as a part of the useful face of the substrate.

Preferably, the action zone may be configured as a stripe, which extends in particular along the length of the substrate, in particular extends along a border, the stripe having a width which is preferentially less than 50% of the width of the substrate, particularly preferentially is less than 40% of the width of the substrate, or is less than 30% of the width of the substrate.

In one exemplary embodiment, the action zone may for example also be located only on the inner side or only on the outer side, or else a combination may be provided in various segments.

The force acting in the direction of the substrate carrier in the region of the action zone in the example, which for example induces local fixing of the glass sheet, may be generated by various mechanisms, for which vacuum, electrostatics or mechanism, but also other forms of force generation, are for example envisioned.

The force acting in the direction of the substrate carrier in the region of the action zone may, for example, be induced by applying a reduced pressure to the surface of the substrate facing toward the substrate carrier, in particular by means of openings in the substrate carrier or an open porosity of the substrate carrier. The force may, for example, also be exerted from above onto the substrate by a downholder. Furthermore, the force may also be induced by an electrical voltage source (for example a charging system, ionization system).

The force acting in the direction of the substrate carrier in the region of the action zone may also be induced by electrostatic charging of the substrate and/or of the substrate carrier.

The force acting in the direction of the substrate carrier in the region of the action zone may furthermore be induced by mechanical pressing or attraction of the substrate onto the substrate carrier.

In general, the force acting in the direction of the substrate carrier, which is exerted onto the substrate in the region of the action zone, may accordingly in particular be a surface-acting force in the physical sense ("pressure" or "surface force").

Regardless of the way in which the force is induced in the region of the action zone, the planarity of the substrate, particularly in the region of the action zone, may however in principle also be increased outside the action zone. At the same time, the stresses occurring in the substrate may be kept small by the local limitation of the action zone, in particular may be kept smaller than in the case of a globally stressed substrate.

While the force acting in the direction of the substrate carrier is being exerted onto the substrate in the region of the action zone, the maximum spacing between the substrate carrier and the substrate in the region of the action zone may be less than 5 mm, preferably be less than 3 mm, particularly preferentially be less than 1 mm.

The states thus generated may be referred to as bistable. The numerical values mentioned by way of example may apply only locally. In addition, the spacing may sometimes depend on the material thickness and/or the initial material stresses. In one example, the aforementioned numerical values may apply for example for a substrate having a thickness of less than 100 μm, in particular less than 70 μm or even less than 50 μm. In one example, the numerical values may result in the case of a substrate which without further external action pointwise has an elevation above the bearing plane of more than 4 mm.

Furthermore, while the force acting in the direction of the substrate carrier is being exerted onto the substrate in the region of the action zone, the maximum tensile stress in the substrate, particularly including the action zone and the compensating zone, may be less than 50 MPa, preferably be less than 30 MPa, particularly preferentially be less than 20 MPa.

Furthermore, while the force is being exerted onto the substrate in the region of the action zone, the maximum tensile stress in the substrate in the region of the action zone may be less than 33 MPa, preferably be less than 20 MPa, particularly preferentially be less than 15 MPa.

In comparison with the tensile stresses mentioned above, in an example with a surface-wide flattened substrate, tensile stresses of up to or in the region of 100 MPa may be formed in the edge region.

The values indicated above in MPa may, for example, be determinable by means of simulation. Due to a zonal stress, the stress may migrate more strongly to the sidewall.

As already described, the method for processing, in particular for pre-dividing, a flat substrate, which may preferably be carried out by the operating station, in particular the pre-dividing station, preferably also comprises processing, in particular pre-division, of the substrate while the force is being exerted onto the substrate in the region of the action zone.

The processing, in particular the pre-division, of the substrate is preferably carried out along a predefined dividing line, which may extend at least partially or even predominantly inside the action zone.

The predefined dividing line preferably extends along the length of the substrate, in particular along a border, the dividing line dividing in particular the waste face from the useful face so that the waste face can be removed and a glass substrate as an end product can be manufactured from the useful face.

In principle, dividing lines may extend straight, extend in a curve, and/or a plurality of dividing lines which intersect may also be provided. Particularly in the case of intersecting dividing lines, sequential processing may be provided.

The processing, in particular the pre-division, of the substrate preferably comprises an introduction of laser radiation into the substrate, particularly in the region of the action zone. In this case, in particular, damages spaced apart from one another in succession along the predefined dividing line may be introduced into the substrate, the damages preferably being configured as filamentary damages and particularly preferably being generated by pulsed laser radiation of an ultrashort-pulse laser.

The processing, in particular the pre-division, of the substrate may generally comprise the introduction of a pre-damage of any type into the substrate, particularly in the region of the action zone. In this case, in particular, a damage may be introduced into the substrate along the predefined dividing line, wherein the damage may for example take place by means of a laser, by means of a scoring wheel, by means of a needle (for example a diamond needle) or other tools for processing the substrate.

The action zone, inside which a force acting in the direction of the substrate carrier is exerted onto the substrate in the example, may in particular be configured as a stripe along a first border and the predefined dividing line, along which the pre-division of the substrate takes place, may extend next to the border, in particular extend along the entire length of the substrate, in such a way that the border can be removed along the dividing line.

One advantage of the method which may be preferably carried out by the operating station, in particular the pre-dividing station, is that the global stresses remain low so that the pre-damage of the substrate may also take place over the glass sidewall. By contrast, tests have shown that in the case of surface-wide fixing, a pre-damage often cannot be introduced across the glass sidewall, but that a sufficient spacing is necessary so that uncontrolled division does not take place. The cause of this is that the tensile stresses occurring on the substrate sidewall due to the flattening of the dominant deformation with a large spatial wavelength (dome, bowl, saddle) are so great that they often exceed the breaking strength of a pre-damage.

In one development, different combinable action zones may also be provided, which can locally stress and/or fix in planar fashion the specific regions depending on the process.

Preferably, for instance a second action zone may be provided, which is configured as a stripe along a second border lying opposite the first border, and a second predefined dividing line may be provided, which extends next to the second border, in particular extends along the entire length of the substrate, in such a way that the second border can be removed along the dividing line.

Furthermore, a third and possibly fourth action zone may also be provided, each of which are for example configured as a stripe along an edge region extending perpendicularly to a border, and a third and possibly fourth predefined dividing line may be provided, each of which extend next to the sidewall of the substrate in such a way that the respective edge region can be removed along the dividing line.

In the case of a plurality of action zones, the force action may take place chronologically in succession inside the plurality of action zones. While the force action is taking place inside a particular action zone, the pre-division is preferably carried out along the associated dividing line, i.e. in particular the dividing line extending through this action zone. Furthermore, it can be provided that the force action takes place simultaneously inside a plurality of groups of action zones of the plurality of action zones and takes place chronologically in succession between the groups of action zones. For example, it can be provided that the zones "overlap", i.e. may be activated in a chronological sequence in such a way that, for example, a plurality are simultaneously active (for example a first zone and a second zone and then a third zone and a fourth zone).

In particular, after the pre-division of the substrate has been carried out along the intended dividing line or dividing lines (for example has been carried out in an operating station designed for the pre-division), division of the substrate may be carried out along the intended dividing line or dividing lines (for example be carried out in an operating station configured for the division).

During the division, a force acting in the direction of the substrate carrier may again preferably be exerted onto the substrate, wherein it may act particularly in the region of the useful face.

Before the pre-division of the substrate along the intended dividing line or dividing lines is carried out (for example is carried out in an operating station configured for the pre-division), application of the substrate onto the substrate carrier may furthermore be carried out (in particular be carried out in an operating station configured for the application).

During the application, a force acting in the direction of the substrate carrier may also be exerted onto the substrate, which may act for example in the region of the useful face and also in the region of the waste face, the force in particular acting first in the region of the useful face and then acting in the region of the waste face, in order to apply the substrate onto the substrate carrier from the inside outward.

The substrate carrier may in particular be configured to be movable and, for example, may be moved from one operating station to the next operating station during the method. The substrate carrier may, for example, be movable inside a plant. The substrate carrier may also be configured to be transportable, for example in such a way that it can be transported between stations or plants (for example by a roller conveyor, robot and/or driverless transport system).

The substrate carrier may furthermore have means in order to exert a force acting in the direction of the substrate carrier onto a placed substrate inside an action zone. The means are, for example, configured as openings in the substrate carrier or as an open porosity of the substrate carrier, in order to exert a reduced pressure onto a substrate placed on the substrate carrier.

In the case of openings in the substrate carrier, these may for example have a diameter of between 0.5 mm and 12 mm, preferably between 1 mm and 6 mm. The openings may, for example, be configured as cylindrical or quasi-cylindrical channels. In the case of an open porosity, this may result from powder-metallurgical processes.

In general, the means for exerting the force may preferably be configured to ensure a local exertion of force. For example, it can be provided that the structure of the clamping system (for example of the vacuum or of the vacuum system) may be formed sufficiently well locally. Preferably, crosstalk onto other zones is precluded or substantially avoided here. In the case of a vacuum, this may sometimes be favored by small diameters of the openings.

The substrate carrier may in principle comprise or consist of various materials, for example comprise or consist of plastic or ceramic.

The substrate carrier is preferably configured to be movable and/or transportable, in order to be able to be moved together with a placed substrate, in particular from one operating station to the next operating station and/or between plants.

In one exemplary embodiment, the substrate carrier comprises an action region inside which the means for force exertion are arranged, the action region being less than 80% of the area of the substrate carrier, preferentially being less than 60% of the area of the substrate carrier, particularly preferentially being less than 40% of the area of the substrate carrier, and/or a compensating region inside which no means for force exertion are arranged, the compensating region being greater than 20% of the area of the substrate carrier, preferentially being greater than 40% of the area of the substrate carrier, particularly preferentially being greater than 60% of the area of the substrate carrier.

The action region may also be less than 70% of the area of the substrate carrier or be less than 30% of the area of the substrate carrier.

The action region may for example be configured as a stripe, which in particular has a width that is less than 50% of the width of the substrate carrier, particularly preferentially is less than 40% of the width of the substrate carrier, or is less than 30% of the width of the substrate carrier. The substrate carrier may furthermore preferably comprise a second action region, which particularly preferentially extends parallel to the first action region, and may furthermore preferably comprise a third and possibly a fourth action region, which particularly preferentially extend perpendicularly to the first or second action region, respectively.

An action region configured as a stripe may also have a width which is less than 70% of the width of the substrate carrier.

BRIEF DESCRIPTION OF THE DRAWINGS

The invention will be explained in more detail below with the aid of some figures, in which.

DETAILED DESCRIPTION OF THE INVENTION

Figure 1:
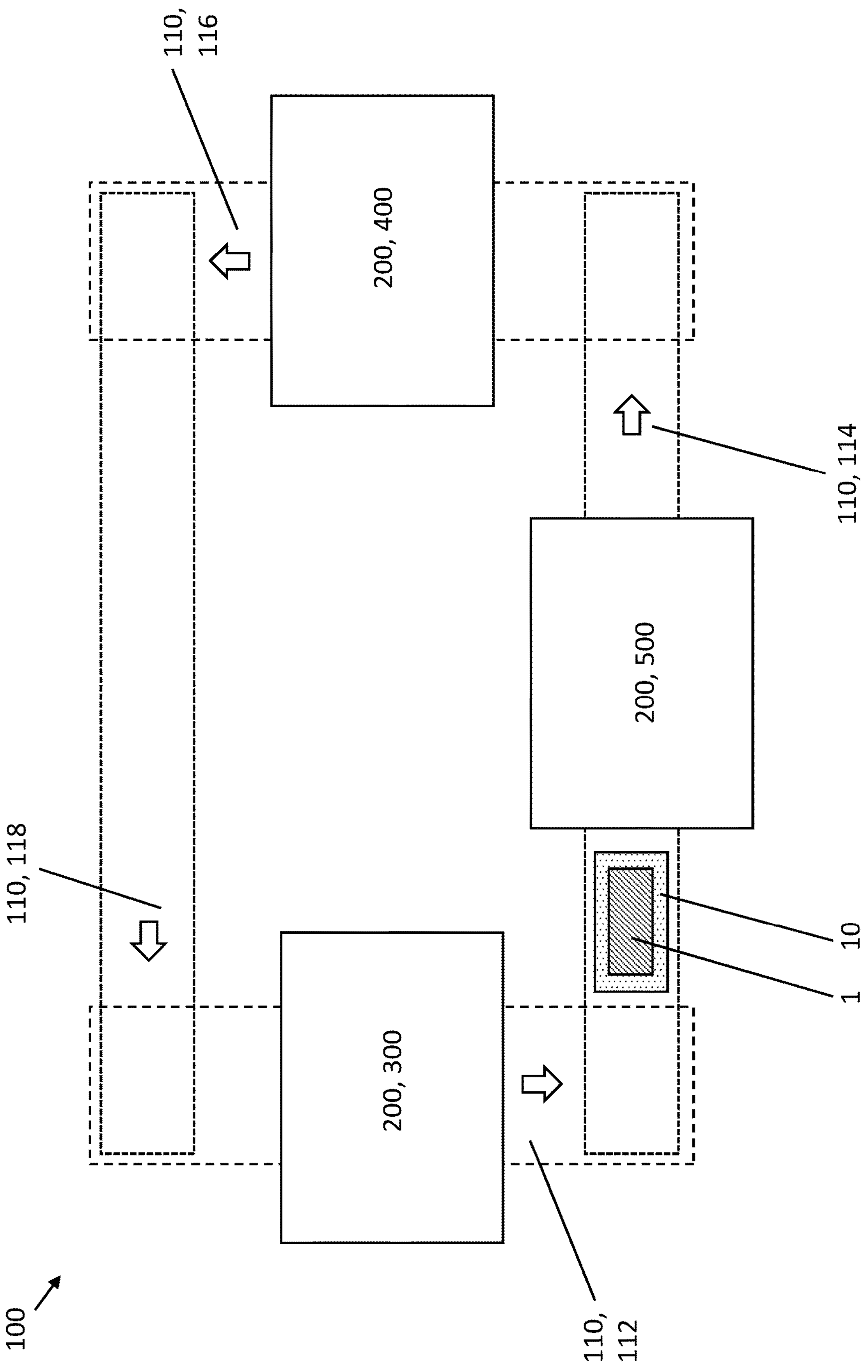
FIG. 1 shows a schematic diagram of a plant for the processing of flat substrates according to a first embodiment.

FIG. 1 shows a plant 100 for the post-processing of flat glass substrates 1 which are placed on a substrate carrier 10 (carrier). The plant comprises a substrate carrier conveyor apparatus 110 configured as a rotary machine or carousel having four conveyor sections 112, 114, 116, 118, which respectively have a conveyor direction denoted by an arrow. The plant 100 furthermore comprises a plurality of processing stations 200 spatially separated from one another, which are connected to one another by the substrate carrier conveyor apparatus 110 in order to convey the substrate carrier 100 respectively along the conveyor direction from one processing station 200 to the next processing station 200.

In this example, the processing station 200 arranged in the first conveyor section 112 is configured as a loading station 300 in order to place the flat substrate 1 onto the substrate carrier 10. The processing station 200 arranged in the second conveyor section 114 is configured as an operating station 500 in order to subject the substrate 1 located on the substrate carrier 10 to a processing step. The processing station 200 arranged in the third conveyor section 116 is configured as an unloading station 400 in order to take the processed substrate off. Via the conveyor section 118, the empty substrate carrier 10 returns to the loading station 300.

Figure 2:
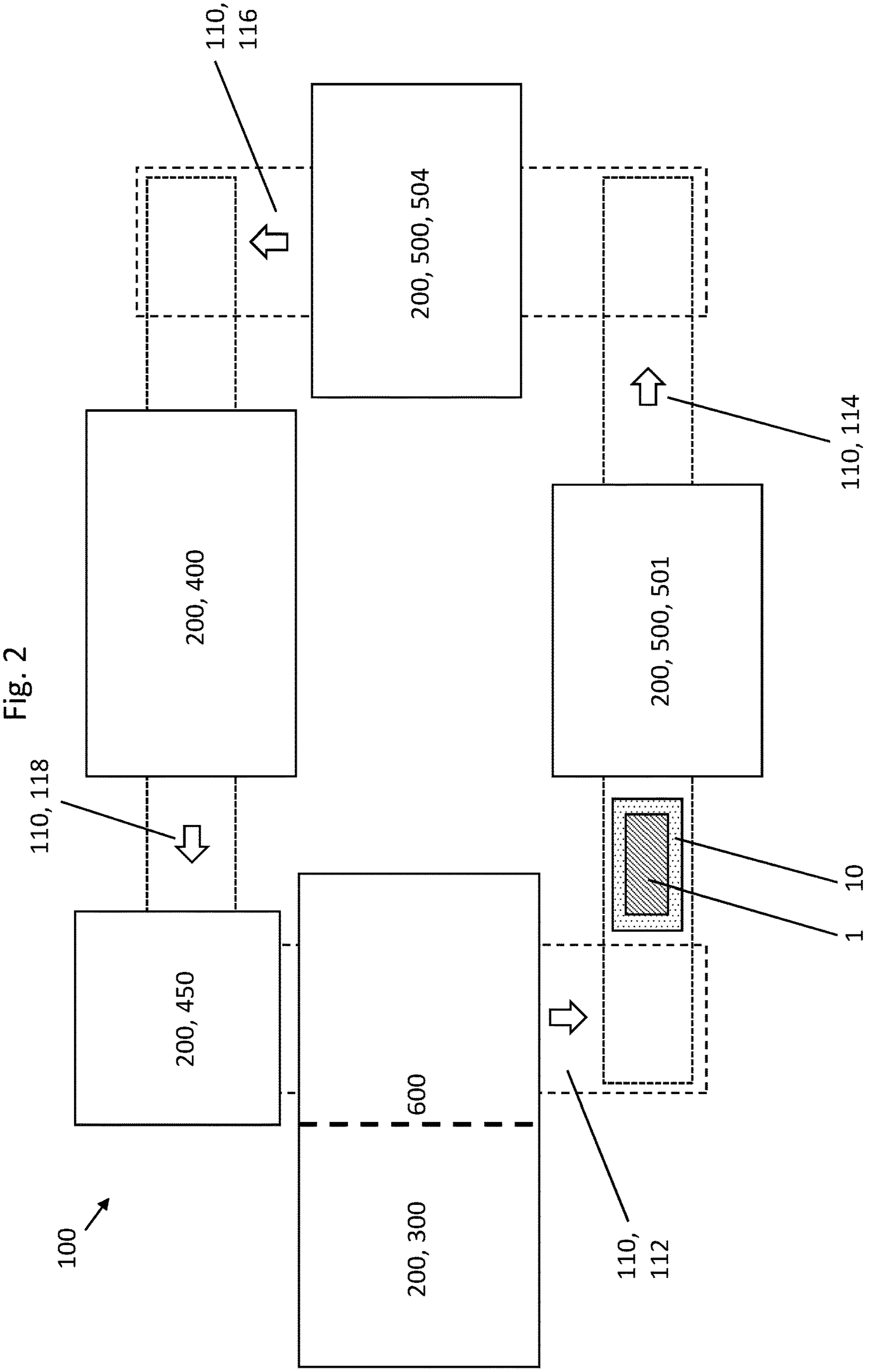
FIG. 2 shows a schematic diagram of a plant for the processing of flat substrates according to a second embodiment.

FIG. 2 likewise shows a plant 100 for the post-processing of glass substrates 1, in particular of UTG. The plant 100 comprises a processing station 200 configured as a loading station 300, wherein the loading station 300 may in particular also comprise an inspection device in order to inspect a flat substrate before it is received. In this example, the plant 100 optionally also comprises an airlock 600 into a white/clean room. The plant 100 furthermore comprises an operating station 500 configured as a pre-dividing station 501, in which the substrate is pre-divided along a dividing line by means of a laser. The plant 100 furthermore comprises an operating station 500 configured as a combined separating and waste station 504, in which the substrate is fractured along the dividing line, the useful material is separated from the waste material and the waste material is rejected. In addition, the plant 100 comprises a processing station 200 configured as an unloading station 400, wherein the latter may in particular also comprise an inspection device in order to inspect a processed flat substrate before it is received, and possibly to reject it. The plant 100 further comprises a processing station 200 configured as a substrate carrier cleaning station 450 in order to clean and/or prepare the substrate carrier 10, wherein an adjustment of surface forces optionally used for the adhesion may be carried out here too.

While during the production of UTG in the online process a horizontal acceleration or a transverse acceleration is difficult, it becomes possible in this case because of the substrate carrier. The post-processing operation may in particular be understood as a downstream offline process, so that a glass strip no longer needs to be paused in an upstream online process in order to carry out particular process steps, for example cutting. Division, in particular spatial division, of the process chain into raw glass production and post-processing may therefore be carried out. For example, an intermediate step of packaging and transport may be provided between shaping and trimming. Nevertheless, direct joining of the post-processing to the upstream process, for example the shaping, may be provided.

The raw glass production may for example comprise a batch mixture which is supplied to a melting process, followed by shaping, an online inspection for glass faults and/or a thickness measurement. This may result in a raw glass sheet (UTG) having borders, which sometimes does not yet have a final format. Transport may, for example, be carried out in a raw glass box or any other suitable transport system.

An offline post-processing line may be configured as a ring concept, or carousel, as stated, wherein the post-processing may preferably be carried out under white or clean room conditions and/or adjusted climatic conditions (T, p, humidity, etc.).

An exemplary plant may for example comprise one or more of the following aspects, in particular stations:

- i. inspection of raw glass substrates (fractures, cracks, etc.)
- ii. automated removal of the raw glass substrates (including optional rejection of dividing (spacer) material, for example sheets of paper) and calibrated placement of the raw glass substrates onto the substrate carrier
- iii. optionally: cleaning of the raw glass substrates (here or at point v.)
- iv. placement of raw glass substrates onto substrate carriers (one or more raw glass substrates)
- v. optionally: cleaning of the raw glass substrates (see above point iii.)
- vi. optionally: checking of the correct position of the raw glass substrates (adjustment of the laser cutting plant to the glass layer on the substrate carrier)
- vii. optionally: inspection and localization of glass faults in order to adapt the filamentation
- viii. (laser, wheel, diamond, water-jet, ultrasonic) cutting to the desired format (for example Gen2, Gen3, Gen5, but also wafer and freeform)

ix. fracture or separation
x. discarding of separators (including waste goods), borders
xi. if appropriate, optionally cleaning of the glass substrates
xii. inspection (sidewalls, fractures, format)
xiii. removal of the glass substrates from the substrate carriers (manual and/or automated)
xiv. packaging (final packaging) including insertion of dividing (spacer) material (pieces of paper)
xv. cleaning of the substrate carriers
xvi. supply of substrate carriers to step iv.

With an exemplary plant, a continuous or discontinuous method comprising one or more of the following steps may for example be carried out:

1) melting a batch mixture,
2) refining the glass melt,
3) homogenizing the glass melt,
4) shaping an endless glass strip by means of down-draw or overflow down-draw methods,
5) cooling the glass strip,
6) examining the glass strip for glass faults,
7) trimming the glass strip into individual glass panels,
8) depositing the glass panels in suitable transport or storage packaging,
9) airlocking the glass panels into the post-processing line,
10) inspecting the glass panel for glass faults and/or cracks,
11) transferring the glass panels onto a suitable substrate carrier,
12) introducing the glass panel on the substrate carrier into a cutting plant,
13) generating premade break points in the glass panel,
14) fracturing the glass panel at the premade break point,
15) separating a useful face of a substrate from a waste face of a substrate,
16) optionally cleaning the "net material", inspecting the "net material",
17) removing the "net material" from the substrate carrier,
18) packaging the "net material" in suitable transport packaging,
19) cleaning the substrate carrier and supplying it to the transfer station (11),
20) airlocking the packaged "net material" out of the post-processing line.

Advantages of the invention are, in particular, a flexible adaptation of the format to be trimmed without downtimes in the melt operation (in the hot manufacturing), added value of the product, by delivering an end product to the customer, in particular by trimming to customer format, high flexibility in relation to the cycle time of the hot forming and offline post-processing, short changeover times in melt operation, in particular when identical raw glass can be produced there continuously (high degree of optimization). For the melt operation, this offers an independence from the final product format, less area requirement in the hot manufacturing, in particular by reducing the "cold end". The division of the process chain into online/offline processing may furthermore ensure a higher overall equipment effectiveness (OEE) and minimization of downtime and/or allow clean or white room conditions during the post-processing. It further allows higher precision of the trimming and optionally an additional quality control before the packaging and conveyor, simplification of upscaling, for example by the parallel operation of a plurality of post-processing lines. In addition, the production in melt operation may be optimized to the extent that a melting tank does not have to be utilized all year round for one type of glass and/or one glass thickness, and may therefore be used for the production of other types of glass and formats. Finally, the invention allows the selection of the substrate area in a glass substrate before the actual trimming, which can lead to less waste in hot manufacturing.

In a plant according to the invention, a cycle time of less than 20 seconds, preferably less than 15 seconds, particularly preferably less than 10 seconds, per substrate may be provided. This makes it possible, for example, for a plurality of plants to be supplied by one upstream production line (hot manufacturing plant/melting tank) in order to generate maximal OEE and cycle rates. For small formats, an even shorter cycle time may sometimes be provided. The invention is preferably suitable for the processing of ultra-thin glass, thin glass, flat glass, wafers, films or other thin substrates.

The invention claimed is:

1. A plant for the multi-step processing of flat substrates, comprising:

a plurality of processing stations spatially divided from one another, which are connected to one another by a substrate carrier conveyor apparatus in order to convey a substrate carrier along a conveyor path defined by the substrate carrier conveyor apparatus from one of the processing stations to the next one of the processing stations in order to subject a flat substrate placed on the substrate carrier successively to a plurality of processing steps in the respective processing stations, wherein one of the processing stations is configured as a loading station, which is designed to place a flat substrate on the substrate carrier, and wherein at least one of the processing stations is configured as an operating station, which is designed to process the flat substrate placed on the substrate carrier, and wherein one of the processing stations is configured as an unloading station, which is designed to remove a processed flat substrate from the substrate carrier, wherein at least one of the following is satisfied:

the substrate carrier conveyor apparatus is configured as a carousel so that it defines a closed conveyor path in order to convey the substrate carrier from the loading station via the at least one operating station and the unloading station back again to the loading station;

the substrate carrier conveyor apparatus comprises a plurality of conveyor sections, each of which define a respective conveyor direction, the conveyor directions of the plurality of conveyor sections extending at an angle with respect to one another; or the substrate carrier conveyor apparatus defines a circular conveyor path.

2. The plant for the multi-step processing of flat substrates of claim 1, wherein the loading station comprises a reception device in order to receive the flat substrate and to place the received substrate on the substrate carrier, wherein the reception device comprises a handling system and/or a suction gripping device with reduced-pressure modules, in order to suction the flat substrate onto the suction gripping device; and/or wherein the loading station comprises an inspection device in order to inspect the flat substrate before it is received.

3. The plant for the multi-step processing of flat substrates of claim 1, wherein one or more of the processing stations comprise means in order to exert a force acting in a direction of the substrate carrier onto the substrate, wherein the means are configured to induce the force acting in the direction of the substrate carrier by applying a reduced pressure to a surface of the substrate facing toward the substrate carrier and/or to induce the force acting in the direction of the substrate carrier by mechanical pressing or attraction of the substrate onto the substrate carrier, and/or to induce the force acting in the direction of the substrate carrier by adhesion forces or surface forces; and/or wherein the plant comprises a substrate carrier which comprises openings or an open porosity for applying reduced pressure to a placed substrate, and/or has a surface that has an increased electrostatic chargeability or increased tribological properties, in order to fix a placed substrate on the substrate carrier.

4. The plant for the multi-step processing of flat substrates of claim 1, wherein one or more of the operating stations is configured as a pre-dividing station, which is designed to pre-divide the flat substrate placed on the substrate carrier along a predefined dividing line, wherein the pre-division comprises introduction of a damage into the substrate, and/or wherein the pre-division comprises introduction of laser radiation into the substrate, damages being introduced into the substrate in succession spaced apart from one another along the predefined dividing line.

5. The plant for the multi-step processing of flat substrates of claim 4, wherein one or more of the operating stations is configured as a separating station, which is designed to separate the flat substrate placed on the substrate carrier along the predefined dividing line into a plurality of portions, wherein the separation comprises action of force, moment, temperature, vibration and/or fracture of the flat substrate on the predefined dividing line at a damage or a plurality of damages which extend along the predefined dividing line.

6. The plant for the multi-step processing of flat substrates of claim 5, wherein one or more of the operating stations is configured as a waste station, which is configured to reject waste material, located on the substrate carrier, of the flat substrate from useful material, located on the substrate carrier, of the flat substrate to reject a portion separated along a predefined dividing line having a waste face of the substrate from a portion separated along the predefined dividing line having a useful face of the substrate, wherein the rejection comprises removal of the portion having the waste face of the substrate from the substrate carrier, and/or wherein the rejection comprises capture and isolation of the portion having the useful face of the substrate from the substrate carrier.

7. The plant for the multi-step processing of flat substrates of claim 6, wherein one or more of the operating stations is both configured as a separating station and is configured as a waste station, in such a way that the operating station forms a combined separating and waste station.

8. The plant for the multi-step processing of flat substrates of claim 1, wherein the unloading station comprises a reception device in order to receive from the substrate carrier a processed flat substrate and/or useful material of the flat substrate, wherein the reception device comprises a handling system and/or a suction gripping device with reduced-pressure modules, in order to suction the processed flat substrate and/or useful material of the flat substrate onto the suction gripping device, and/or wherein the unloading station comprises an inspection device in order to inspect a processed flat substrate and/or useful material of the flat substrate before it is received.

9. The plant for the multi-step processing of flat substrates of claim 7, wherein one of the processing stations is configured as a substrate carrier cleaning station, which is designed to clean the substrate carrier after a processed flat substrate and/or useful material of the flat substrate has been taken from the substrate carrier.

10. The plant for the multi-step processing of flat substrates of claim 9, wherein the loading station is arranged between the substrate carrier cleaning station and the pre-dividing station within the conveyor path; and/or wherein the pre-dividing station is arranged between the loading station and the separating station within the conveyor path; and/or wherein the separating station is arranged between the pre-dividing station and the waste station within the conveyor path; and/or wherein the waste station is arranged between the separating station and the unloading station within the conveyor path; and/or wherein the combined separating and waste station is arranged between the pre-dividing station and the unloading station within the conveyor path; and/or wherein the unloading station is arranged between the waste station and the substrate carrier cleaning station within the conveyor path; and/or wherein the substrate carrier cleaning station is arranged between the unloading station and the loading station within the conveyor path.

11. The plant for the multi-step processing of flat substrates of claim 9, wherein the substrate carrier conveyor apparatus comprises a first conveyor section, a second conveyor section, a third conveyor section, and a fourth conveyor section, wherein at least one of the following is also satisfied:

wherein the loading station is arranged inside the first conveyor section or the second conveyor section of the substrate carrier conveyor apparatus;

wherein the pre-dividing station is arranged inside the second conveyor section of the substrate carrier conveyor apparatus;

wherein the separating station is arranged inside the second conveyor section or the third conveyor section of the substrate carrier conveyor apparatus;

wherein the waste station is arranged inside the second conveyor section or the third conveyor section of the substrate carrier conveyor apparatus;

wherein the combined separating and waste station is arranged inside the second conveyor section or the third conveyor section of the substrate carrier conveyor apparatus;

wherein the unloading station is arranged inside the third conveyor section or the fourth conveyor section of the substrate carrier conveyor apparatus; or wherein the substrate carrier cleaning station is arranged inside the fourth conveyor section of the substrate carrier conveyor apparatus.

12. The plant for the multi-step processing of flat substrates of claim 1, further comprising a white room and/or a clean room in which the substrate carrier conveyor apparatus and/or the processing stations are arranged; and/or wherein the plant is joined directly to a device for melting and/or shaping raw material for the flat substrates.

13. A method for the multi-step processing of flat substrates on a substrate carrier, wherein a flat substrate is placed on the substrate carrier in a processing station configured as a loading station;

wherein the substrate carrier is conveyed together with the placed flat substrate from the loading station by means of a substrate carrier conveyor apparatus directly or via one or more further processing stations to a processing station configured as an operating station;

wherein the flat substrate placed on the substrate carrier is processed in the operating station;

wherein the substrate carrier is conveyed together with the placed processed flat substrate from the operating station by means of the substrate carrier conveyor apparatus directly or via one or more further processing stations to a processing station configured as an unloading station; and wherein the processed flat substrate placed on the substrate carrier is taken from the substrate carrier in the unloading station, wherein at least one of the following is satisfied:

the substrate carrier conveyor apparatus is configured as a carousel so that it defines a closed conveyor path in order to convey the substrate carrier from the loading station via the at least one operating station and the unloading station back again to the loading station;

the substrate carrier conveyor apparatus comprises a plurality of conveyor sections, each of which define a respective conveyor direction, the conveyor directions of the plurality of conveyor sections extending at an angle with respect to one another; or the substrate carrier conveyor apparatus defines a circular conveyor path.

14. The method for the multi-step processing of flat substrates of claim 13, wherein the substrate carrier is conveyed from the unloading station by means of the substrate carrier conveyor apparatus back again to the loading station.

15. The method for the multi-step processing of flat substrates of claim 13, wherein the substrate carrier is conveyed together with the placed flat substrate from the loading station by means of the substrate carrier conveyor apparatus directly or via one or more further processing stations to an operating station configured as a pre-dividing station; and wherein the flat substrate placed on the substrate carrier is pre-divided along a predefined dividing line in the pre-dividing station; and wherein the substrate carrier is conveyed together with the placed pre-divided flat substrate from the pre-dividing station by means of the substrate carrier conveyor apparatus directly or via one or more further processing stations to an operating station configured as a separating station; and wherein the pre-divided flat substrate placed on the substrate carrier is separated along the predefined dividing line into a plurality of portions in the separating station; and wherein the substrate carrier is conveyed together with the plurality of portions of the flat substrate from the separating station by means of the substrate carrier conveyor apparatus directly or via one or more further processing stations to an operating station configured as a waste station, or wherein the operating station configured as a separating station is simultaneously configured as a waste station; and wherein at least one portion of the flat substrate is rejected in the waste station.

16. A plant for the multi-step processing of flat substrates, comprising:

a plurality of processing stations spatially divided from one another, which are connected to one another by a substrate carrier conveyor apparatus in order to convey a substrate carrier along a conveyor path defined by the substrate carrier conveyor apparatus from one of the processing stations to the next one of the processing stations in order to subject a flat substrate placed on the substrate carrier successively to a plurality of processing steps in the respective processing stations, wherein one of the processing stations is configured as a loading station, which is designed to place a flat substrate on the substrate carrier, and wherein at least one of the processing stations is configured as an operating station, which is designed to process the flat substrate placed on the substrate carrier, and wherein one of the processing stations is configured as an unloading station, which is designed to remove a processed flat substrate from the substrate carrier, wherein at least one of the following is satisfied:

the substrate carrier conveyor apparatus comprises a plurality of conveyor sections, each of which define a respective conveyor direction, the conveyor directions of the plurality of conveyor sections extending at an angle with respect to one another; or the substrate carrier conveyor apparatus defines a circular conveyor path.

* * * * *